(12) United States Patent
Yen

(10) Patent No.: US 12,462,528 B2
(45) Date of Patent: Nov. 4, 2025

(54) METHOD FOR CLASSIFYING IMAGES AND ELECTRONIC DEVICE

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 529 days.

(21) Appl. No.: 18/108,786

(22) Filed: Feb. 13, 2023

(65) Prior Publication Data

US 2024/0135679 A1 Apr. 25, 2024
US 2024/0233325 A9 Jul. 11, 2024

(30) Foreign Application Priority Data

Oct. 25, 2022 (CN) .......................... 202211313493.5

(51) Int. Cl.
*G06V 20/70* (2022.01)
*G06V 10/26* (2022.01)
*G06V 10/32* (2022.01)
*G06V 10/764* (2022.01)
*G06V 10/77* (2022.01)
*G06V 10/774* (2022.01)
*G06V 10/82* (2022.01)

(52) U.S. Cl.
CPC ............ *G06V 10/764* (2022.01); *G06V 10/26* (2022.01); *G06V 10/32* (2022.01); *G06V 10/7715* (2022.01); *G06V 10/774* (2022.01); *G06V 10/82* (2022.01); *G06V 20/70* (2022.01)

(58) Field of Classification Search
CPC ...... G06V 10/764; G06V 10/26; G06V 10/32; G06V 10/7715; G06V 10/774; G06V 10/82; G06V 20/70; G06V 10/454
See application file for complete search history.

(56) References Cited

U.S. PATENT DOCUMENTS

| | | | |
|---|---|---|---|
| 9,901,815 B2 * | 2/2018 | Sarrafzadeh ........... | G16H 40/67 |
| 10,977,524 B2 * | 4/2021 | Samala .................. | G06V 10/26 |
| 11,645,357 B2 * | 5/2023 | Zhang ...................... | G06F 7/36 |
| | | | 706/25 |

FOREIGN PATENT DOCUMENTS

CN 106650721 A 5/2017

* cited by examiner

*Primary Examiner* — Andrew M Moyer
*Assistant Examiner* — Ahmed A Nasher
(74) *Attorney, Agent, or Firm* — ScienBiziP, P.C.

(57) ABSTRACT

A method for identifying images of any kind of object, applied in an electronic device, obtains images to be classified, and obtains classification models and target models. Image segmentation on the images is carried out and target images are obtained; target images are input into each of the input layers and target feature maps are generated; target values according to size of each target feature map are generated; a convolution operation on the target feature maps generates feature values and a target vector of each target model is generated according to average pooling layers, feature values, and target values. The target vector is input into classification layers of a target model and label categories and probability values of categories obtained, enabling classification of images according to the label categories and the probability values of categories.

20 Claims, 3 Drawing Sheets

METHOD FOR CLASSIFYING IMAGES AND ELECTRONIC DEVICE

This application claims priority to Chinese Patent Application No. 202211313493.5 filed on Oct. 25, 2022, in China National Intellectual Property Administration, the contents of which are incorporated by reference herein.

FIELD

The subject matter herein generally relates to a field of image analysis, in particular, relates to a method for classifying images and an electronic device.

BACKGROUND

In a current scheme of classifying images by using a neural network model, the global average pooling layers in the neural network model have many parameters and complicated operations, resulting in a large amount of memory required to perform image classification by a hardware accelerator, and resulting in high power consumption.

BRIEF DESCRIPTION OF THE DRAWINGS

Implementations of the present disclosure will now be described, by way of embodiment, with reference to the attached figures.

DETAILED DESCRIPTION

Figure 1:
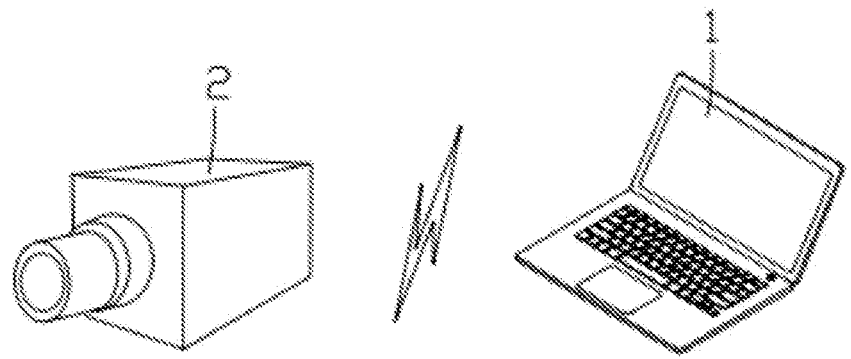
FIG. 1 shows an operating environment of one embodiment of a method for classifying images.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of a method for classifying images. In one embodiment, the method can be applied in one or more electronic devices 1, and the electronic device 1 is in communication with a photographing device 2. In one embodiment, the photographing device 2 can be a camera or other device for photographing. In one embodiment, the electronic device 1 can obtain at least one image of target objects to be classified using the photographing device 2. In one embodiment, the target objects may be animals such as cats and dogs, or a commercial product.

In one embodiment, the electronic device 1 is a device that can automatically perform calculation of parameter value and/or information processing according to pre-set or stored instructions. In one embodiment, hardware of the electronic device 1 includes, but is not limited to a microprocessor, an Application Specific Integrated Circuit (ASIC), a Field-Programmable Gate Array (FPGA), a Digital Signal Processor (DSP), or an embedded device, etc.

In one embodiment, the electronic device 1 can be any electronic product that can interact with a user, such as a personal computer, a tablet computer, a smart phone, a Personal Digital Assistant (PDA), a game console, and an Internet Protocol Television (IPTV), a smart wearable device, etc.

In one embodiment, the electronic device 1 may also include a network equipment and/or a user equipment. In one embodiment, the network device includes, but is not limited to, a single network server, a server group consisting of multiple network servers, or a cloud computing-based cloud consisting of a large number of hosts or network servers.

In one embodiment, a network connected to the electronic device 1 includes, but is not limited to, the Internet, a wide area network, a metropolitan area network, a local area network, and a Virtual Private Network (VPN).

Figure 2:
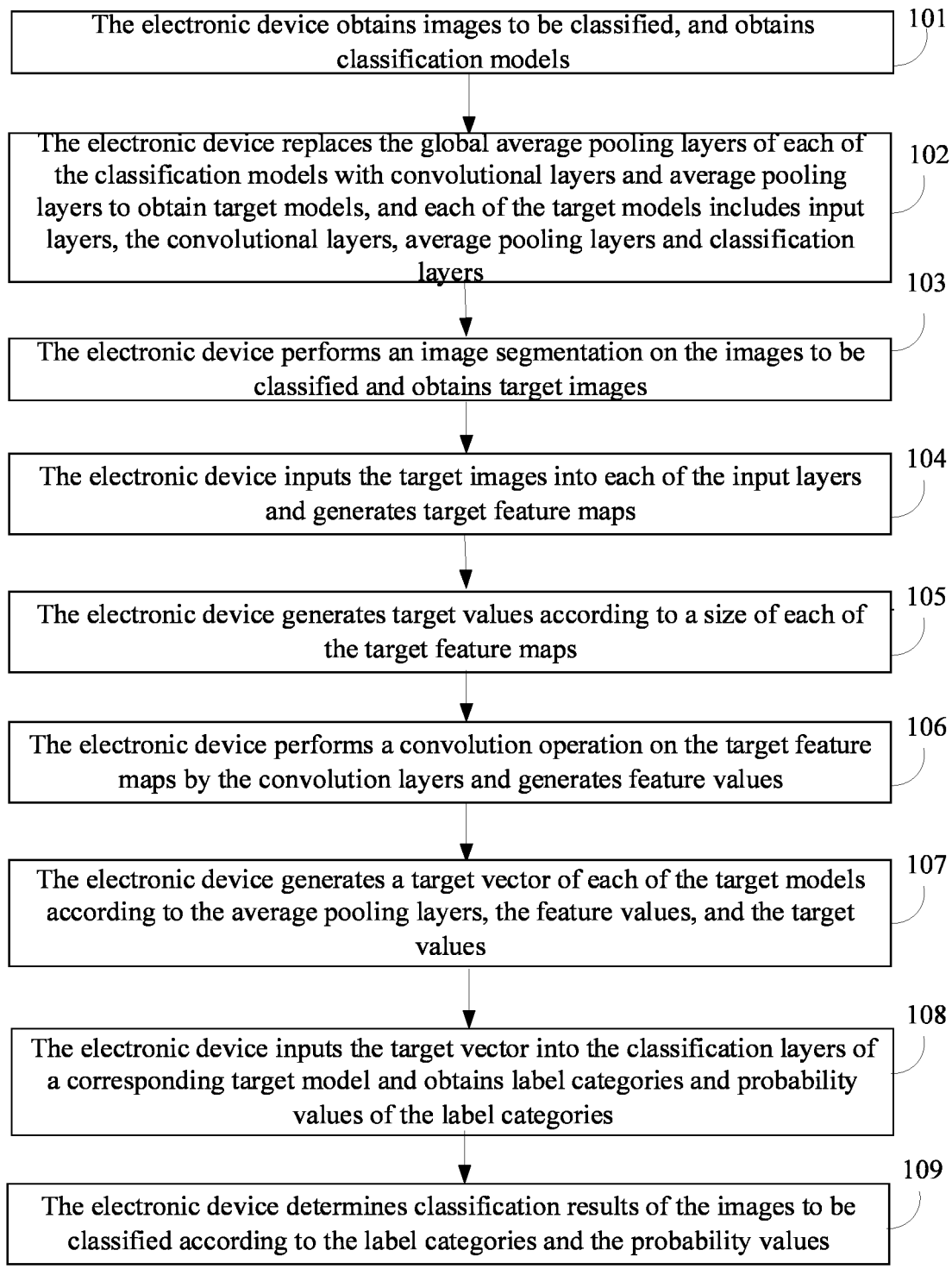
FIG. 2 is a flowchart of one embodiment of the method of FIG. 1.

FIG. 2 illustrates the method for classifying images. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, the electronic device obtains images to be classified, and obtains classification models.

In one embodiment, the classification model refers to a model that can predict classes of categories of images of objects.

In one embodiment, the images to be classified refer to images that need to be classified.

In one embodiment, the classification model includes global average pooling layers. The global average pooling layers calculate pixel average values of all pixel values in feature maps of the images, and splice the pixel average values to generate a target vector.

In one embodiment, the electronic device 1 obtains the images to be classified. In one embodiment, the electronic device 1 controls the photographing device 2 to photograph objects to be classified, and obtains the images to be classified from the photographing device 2.

In one embodiment, the objects to be classified includes any objects such as animals and plants.

In one embodiment, the electronic device 1 obtains the number of classification models. In one embodiment, the electronic device 1 obtains training images, and constructs classification networks according to different convolutional neural networks. Further, the electronic device 1 trains each of the classification networks according to the training images and obtains the number of classification models.

In one embodiment, the training images refer to images of different objects, which include animals (egg, puppies, kittens, rabbits, etc.), plants (egg, flowers, trees, etc.), etc. In one embodiment, the training image can be used to train the classification networks, and the training images and the image categories of the training image can be obtained from a preset database. The preset database can be a CIFAR-10 database, an ImageNet database, etc.

In one embodiment, the convolutional neural networks include, but are not limited to, VGG16 networks, ResNet networks, and AlexNet networks.

In one embodiment, the electronic device 1 encodes the image categories of each training image into a corresponding image category vector by one-hot encoding method.

In one embodiment, the electronic device 1 inputs the training images into each of the classification networks, and uses a softmax activation function to classify the training images in each of the classification networks to obtain a predicted category vector of each of the training images. A calculation method of the predicted category vector is the same as the calculation method of a probability of labeled categories below, not repeated here.

The electronic device 1 calculates cross-entropy loss values of each of the classification networks, and performs back-propagation on each of the classification networks based on the cross-entropy loss values, until the cross-entropy loss values drop to a preset value, and thereby obtains the classification models.

In one embodiment, the calculation formula of the cross entropy loss values is: $H(p, q)=-\Sigma_i p_i \log q_i$; where $H(p, q)$ refers to the cross-entropy loss values, $p_i$ is a ith element in the image category vectors of the training images, and $q_i$ is the ith element in the predicted category vector of the training images.

In one embodiment, the preset value can be set according to requirement, which is not limited in present disclosure.

In one embodiment, a first classification network is constructed based on the VGG16, and a second classification network is constructed based on the ResNet. There are three image categories of the training images. When one of the training images is an image of a cat, "cat" will be the image category, and the image category vector obtained by one-hot encoding method is [1, 0, 0]. The cat image is input into the first classification network and the second classification network; when the predicted category vector of the cat image output by the first classification network is [0.5, 0.4, 0.1], and the predicted category vector of the cat image output by the second classification network is [0.8, 0.1, 0.1]; according to the above formula of the cross entropy loss value, it is calculated that the cross entropy loss value of the first classification network is about 0.69, and the cross entropy loss value of the second classification network is about 0.22.

At block 102, the electronic device replaces the global average pooling layers of each of the classification models with convolutional layers and average pooling layers to obtain target models. Each of the target models includes input layers, the convolutional layers, average pooling layers, and classification layers.

In one embodiment, the target models refer to models obtained by replacing the global average pooling layers in the classification models with convolutional layers and average pooling layers.

At block 103, the electronic device performs an image segmentation on the images and obtains target images.

In one embodiment, "target image" refers to areas in images which contain the objects to be classified.

In one embodiment, the electronic device 1 performs an image enhancement processing on the images to be classified and obtains enhanced images, and performs a binarization processing on the enhanced images and obtains binarized images. Further, the electronic device 1 determines a position of objects in the binarized images according to a difference in the pixel values of the pixel points in the binarized images, and segments the binarized images according to the position of the objects, so obtaining target areas. The electronic device 1 performs a normalization processing on sizes of the target areas to obtain the target images.

In one embodiment, the image enhancement processing includes, but is not limited to, grayscale processing, filtering, and denoising, etc. The normalization processing includes, but is not limited to, cropping the target areas in respect of length and width.

In one embodiment, the electronic device 1 traverses the pixel values of all pixel points in the enhanced images, and determines pixel points corresponding to pixel values at least equal to a configuration value in the enhanced images as foreground pixel points, and determines the pixel points corresponding to the pixel values of less than that as the background pixel points. Further, the electronic device 1 adjusts the pixel values of the foreground pixel points to a first preset value, and adjusts the pixel values of the background pixel points to a second preset value, and obtains the binarized images.

In one embodiment, the configuration value, the first preset value, and the second preset value can be set according to user's requirement, which is not limited in present disclosure.

In one embodiment, the electronic device 1 determines an area formed by the foreground pixel points as an area which includes the objects to be classified, and determines the position of the area formed by the foreground pixel points according to the difference between the pixel values of the foreground pixel points and the pixel values of the target pixel points, and obtains the position of the objects to be classified.

By the above-mentioned embodiments, performing image enhancement processing and binarization processing on the images makes the objects to be classified more obvious and clearer, therefore segmenting the area containing the objects from the images is necessary. Since the area of the images is reduced, a speed of feature extraction can be improved, and the size of the target areas is standardized to ensure that the target images have the same length and width.

At block 104, the electronic device inputs the target images into each of the input layers and generates target feature maps.

In one embodiment, the target feature maps refer to feature maps obtained after the input layers perform feature extraction on the target images, each one of the target feature maps is a square.

In one embodiment, each of the input layers can contain multiple layers such as convolution layers, pooling layers, activation function layers, flattening layer, etc.

In one embodiment, since the length and the width of the target images are the same, the length and width of the target feature maps will be the same.

At block 105, the electronic device generates target values according to a size of each of the target feature maps.

In one embodiment, the target value refers to a number of values generated according to the size of each of the target feature maps.

In one embodiment, when the length and the width of each of the target feature maps include one or more factors, the electronic device 1 factorizes the length of each of the target feature maps to obtain decomposed length values that are different from each other, and factorizes the width of each of the target feature maps to obtain decomposed width values that are different from each other. Further, the electronic device 1 multiplies each of the decomposed length values and decomposed width value with the same value to obtain the target values. When the length and the width of each of the target feature maps does not include factors, the electronic device 1 uses a multiplication result of the length and the width of as the target values.

For example, where the multiplied length and the width of any target feature map is 6, the electronic device 1 factorizes the length 6 and the width 6, obtaining the first decomposed length value of 2 and the second decomposed length value of 3. The electronic device 1 multiplies the first decomposed length value 2 and the first decomposed width value 2 to obtain the first target value 4, multiplies the second decomposed length value 3 and the second decomposed width value 3 to obtain the second target value 9.

By the above, the length and the width of each of the target feature maps are decomposed into smaller values, and the decomposed length values and the decomposed width values with the same values are multiplied to obtain the target values. This is more convenient for quickly calculating the average values of the total pixel values corresponding to all pixel points in the target feature maps.

At block 106, the electronic device performs a convolution operation on the target feature maps by the convolution layers and generates feature values.

In one embodiment, the feature values refer to a sum of the pixel values of all pixel points in each of the target feature maps.

In one embodiment, the electronic device 1 performs the convolution operation on the target feature maps by the convolution layers and generates the feature values.

In one embodiment, the electronic device 1 generates a size of a convolution kernel according to the length and the width of each target feature map. In one embodiment, if the length and the width of each target feature map includes the factors, the electronic device 1 determines the size of the convolution kernel according to the decomposed length value and the decomposed width value with the same value; or if the length and the width of each target feature map do not include the factors, the electronic device 1 selects a preset size as the size of the convolution kernel. In one embodiment, if there is no multiplicative relationship between the length and the width and the size of the convolution kernel, the electronic device 1 performs a zero-padding processing on each target feature map until the length and the width of the target feature map after filling are multiples of the size of the convolution kernel, the electronic device 1 extracts a convolution stride from the size of the convolution kernel, and uses the convolution kernel to perform the convolution operation on each target feature map after performing zero-padding processing to obtain the feature values.

When the length and the width of each target feature map can be decomposed, by directly using the decomposed length value and the decomposed width value obtained after decomposition, as the size of the convolution kernel, this avoids performing zero-padding processing on the target feature maps.

In one embodiment, the preset sizes may include, but are not limited to, 3*3, 5*5.

For example, when the length and the width of one target feature map are 7, that is, when the size of the target feature map is 7*7, the electronic device 1 selects 3*3 as the size of the convolution kernel. Since there is no multiplicative relationship between the size of 7*7 and the size of the convolution kernel of 3*3, the electronic device 1 performs zero-padding processing on the target feature map. When the size of the target feature map after zero-padding processing is 9*9, the multiplicative relationship is satisfied, and the zero-padding processing is stopped. As the size of the convolution kernel is 3*3, the electronic device 1 sets the convolution stride to 3. Based on the convolution step size of 3, the electronic device 1 uses the convolution kernel of size 3*3 to perform two convolution operations on the target feature map of size 9*9 to obtain the feature values.

In one embodiment, the elements in the convolution kernel can be set to a value of 1, so that the convolution of each feature map is equivalent to adding the pixel values of all pixel points in each target feature map. Therefore, the characteristic values can be quickly obtained.

At block 107, the electronic device generates a target vector of each of the target models according to the average pooling layers, the feature values, and the target values.

In one embodiment, the target values may refer to a product of the length and the width of each of the target feature maps, or the target values may refer to values decomposed according to the size of each of the target feature maps.

In one embodiment, the target vector refers to a vector consisting of the pixel average values, and the pixel average values refer to a ratio of the feature values to the target values corresponding to the feature values.

In one embodiment, the electronic device 1 generates the target vector of each of the target models according to the average pooling layers, the feature values, and the target values.

In one embodiment, the electronic device 1 generates the pixel average value corresponding to the feature values according to the target values. In one embodiment, if a number of the target values are singular, the electronic device 1 calculates the ratio of each of the feature values to one target value, and obtains the pixel average value corresponding to each of the feature values. If the number of the target values are multiple, the electronic device 1 calculates a first ratio of each of the feature values to a first target value, and calculates a second ratio of the first ratio to a second target value, and the above calculation of ratios is repeated until a final ratio corresponding to the last target value is obtained. The final ratio is taken as the pixel average value corresponding to each of the feature values. Further, the electronic device 1 splices the pixel average values and obtains the target vector.

In one embodiment, when the number of the target values is multiple, by performing multiple divisions on each of the feature values and the corresponding target values, a complexity of each division operation is reduced.

By the above, the feature values and the target values are input into the average pooling layers, and the pixel average values of the pixel values of all pixel points in each target feature map can be calculated by using the division function of the average pooling layers. The pixel average values are spliced to obtain the target vector. As the target vector contains the pixel average values of the target feature maps, the target vector will more comprehensively reflect the features of the objects to be classified.

At block 108, the electronic device inputs the target vector into the classification layers of a corresponding target model and obtains label categories and probability values of the label categories.

In one embodiment, the classification layers refer to the network layers that classify the target vector.

In one embodiment, the labeled categories refer to the predicted categories of the images output by each target model. The label categories may include cats, dogs, etc., and the label categories may be the image categories.

In one embodiment, the classification layers can be a softmax classifier, and the number of the label categories is equal to the number of all elements in the target vector.

In one embodiment, the probability values are calculated according a formula $$S_i = \frac{e^{z_j}}{\sum_j^k e^{z_j}},$$

i=1, 2, . . . , k; where $S_i$ refers to a probability value that the objects belong to ith label category, $e^{z_j}$ refers to a single rating value of jth element in the target vector, $z_j$ refers to the jth element in the target vector, $\sum_j^k e^{z_j}$ refers to a total rating value of all elements in the target vector, i refers to the ith label category, and k refers to the number of the multiple label categories. The sum of the probability values of the label category is 1.

By classifying the target vector in the above-mentioned embodiment, each target model can obtain the predicted categories of the objects to be classified and the corresponding probability value of each predicted category, which achieves a preliminary identification of the category to which the objects belong.

At block 109, the electronic device determines classification results of the images to be classified according to the label categories and the probability values.

In one embodiment, the classification results refer to categories being finally predicted by the target models. The classification results may also include categories such as cats, dogs, flowers, etc.

In one embodiment, the electronic device 1 determines the classification results of the images to be classified according to the label categories and the corresponding probability values.

In one embodiment, the electronic device 1 determines the classification results of the images to be classified according to the label categories and the corresponding probability values.

In one embodiment, the electronic device 1 calculates a probability average value of the same label category in the target models, and determines the label category which corresponds to a largest probability average value as a classification result of the images to be classified.

In one embodiment, the electronic device 1 calculates the number of categories of the classification models, and counts a sum of the probability values of each label category output by the classification models to obtain the sum of the probability values, and calculates a ratio of the sum of probability values to the number of the categories to obtain the probability average value.

In one embodiment, the electronic device constructs a first classification network based on the VGG16, constructs a second classification network based on the ResNet, and constructs the third classification network based on the AlexNet. The number of categories of the classification models is therefore 3. If there are two label categories, the probability value that the first classification network recognizes the images to be classified as a cat is 0.98, and the probability value that the images is recognized as a dog is 0.02; the probability value that the second classification network recognizes the image to be classified as a cat is 0.95, and the probability value that the image is recognized as a dog is 0.05; the probability value that the third classification network recognizes the image to be classified as a cat is 0.92, and the probability value that the image is recognized as a dog is 0.08. The sum of the probability values of the above three classification models identifying the image to be classified as a cat is 2.85, and the probability average value of it being a cat is 0.95 calculated according to the sum of the probability values (2.85) and the number of categories (3) of the classification models. Calculated in the same way, the probability average value for dog is calculated to be 0.05. As the probability value for cat is greater than that for dog, the image to be classified is determined to be an image of a cat.

By calculating the probability average value of each label category output by the target models, the label category corresponding to the maximum probability average value is taken as the classification result. As the classification result of the images to be classified are integrated by multiple target models, the classification results are more comprehensive.

By the above embodiments, the target image is obtained by segmenting the image to be classified, and the target image is input into each of the classification models. Since the area of the target image is reduced, a range of features extraction can also be reduced, thereby accelerating the speed of feature extraction. Replacing the global average pooling layers with the convolution layers and the average pooling layers not only reduces the number of parameters of the classification models, but also reduces hardware design of the global average pooling function in a hardware accelerator, thereby saving hardware resources and reducing power consumption. In the present disclosure, the multiple target values are generated according to the size of each second feature map, and the size of each second feature map can be decomposed into multiple target values with smaller values, thereby improving speed. In the present disclosure, a target vector is generated based on the average pooling layers, the feature values, and the target value, and the pixel average value of each target feature map is calculated by dividing the average pooling layers, and the pixel average value is spliced into the target vector, and the target vector is input into the corresponding classification layers to obtain the probability values of the label categories output by each target model. The classification of the images is determined according to the probability values of the label categories, making the classification result more comprehensive and accurate.

Figure 3:
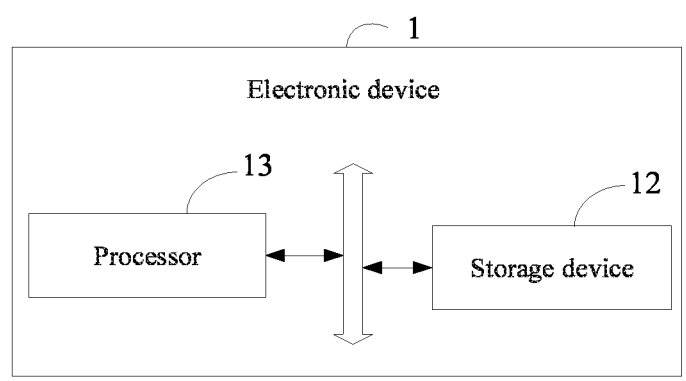
FIG. 3 is a structural diagram of one embodiment of an electronic device performing the method of FIG. 2.

FIG. 3 illustrates a structural diagram of an electronic device. In one embodiment, the electronic device 1 includes, but is not limited to, a storage device 12, a processor 13, and a computer program stored in the storage device 12 and executed by the processor 13. For example, the computer program can be a program of image classification.

Those skilled in the art can understand that the schematic structural diagram is only an example of the electronic device 1, and does not constitute a limitation on the electronic device 1, other examples may include more or less components than the one shown, or combine some components, or have different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the method, for example, to implement each block shown in FIG. 2.

Exemplarily, the computer program can be divided into one or more modules/units, and the one or more modules/units are stored in the storage device 12 and retrieved by the processor 13 to achieve the application of the method. The one or more modules/units may be a series of computer program instruction segments capable of performing specific functions, and the instruction segments describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created in the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the method implements all or part of the processes in the methods of the above embodiments, and can also be completed by instructing the relevant hardware through a computer program. The computer program can be stored in a computer-readable storage medium, and when the computer program is acquired by the processor, the blocks of the method embodiments can be implemented.

The computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the method for classifying images, and the processor 13 can acquire the plurality of instructions to implement processes of: obtaining images to be classified, and obtaining a number of classification models; replacing the global average pooling layers of each of the classification models with convolutional layers and average pooling layers to obtain target models, each of the target models including input layers, convolutional layers, average pooling layers, and classification layers; performing image segmentation on the images to be classified and obtaining target images; inputting the target images to each of the input layers to generate target feature maps; generating target values according to the size of each of the target feature maps; using the convolution layers to perform a convolution operation on the target feature maps to generate feature values; generating a target vector of each of the target models according to the average pooling layers, the feature values, and the target values; inputting the target vector into the classification layers of corresponding target models to obtain label categories and corresponding probability values; determining classification according to the label categories and the corresponding probability values.

Specifically, for the specific implementation method of the above-mentioned instruction by the processor 13, reference may be made to the description of the relevant blocks in the corresponding embodiment of FIG. 2, and details are not repeated.

In the several embodiments provided in this disclosure, it should be understood that the devices and methods disclosed can be implemented by other means. For example, the device embodiments described above are only schematic. For example, the division of the modules is only by logical function, and can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description only represents some embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for classifying images comprising:
    obtaining images to be classified, and obtaining classification models;
    replacing global average pooling layers of each of the classification models with convolutional layers and average pooling layers and obtaining target models, each of the target models comprising input layers, the convolutional layers, average pooling layers and classification layers;
    performing an image segmentation on the images and obtaining target images;
    inputting the target images into each of the input layers and generating target feature maps;
    generating target values according to a size of each of the target feature maps;
    performing a convolution operation on the target feature maps by the convolution layers and generating feature values;
    generating a target vector of each of the target models according to the average pooling layers, the feature values, and the target values;
    inputting the target vector into the classification layers of a corresponding target model and obtaining label categories and probability values of the label categories;
    determining classification results of the images according to the label categories and the probability values of the label categories.

2. The method as recited in claim 1, wherein obtaining the classification models comprises:
    obtaining training images;
    constructing classification networks according to different convolutional neural networks;
    training each of the classification networks according to the training images and obtaining the classification models.

3. The method as recited in claim 1, wherein performing the image segmentation on the images and obtaining the target images comprises:
    performing an image enhancement processing on the images and obtaining enhanced images;
    performing a binarization processing on the enhanced images and obtaining binarized images;
    determining a position of objects in the binarized images according to a difference in pixel values of the pixel points in the binarized images;
    segmenting the binarized images according to the position of objects, and obtaining target areas;
    performing a normalization processing on sizes of the target areas and obtaining the target images.

4. The method as recited in claim 1, wherein generating the target values according to the size of each of the target feature maps comprises:
    when a length and a width of each of the target feature maps comprises factors, factorizing the length of each of the target feature maps and obtaining decomposed length values that are different from each other, and factorizing the width of each of the target feature maps and obtaining decomposed width values that are different from each other;
    multiplying each of the decomposed length values and a corresponding decomposed width value with the same value and obtaining the target values; or
    when the length and the width of each of the target feature maps do not comprise factors, taking a multiplication result of the length and the width of as the target values.

5. The method as recited in claim 4, wherein performing the convolution operation on the target feature maps by the convolution layers and generating the feature values comprises:
    generating a size of a convolution kernel according to the length and the width of each of the target feature maps, comprising: when the length and the width of each of the target feature maps comprises the factors, determining the size of the convolution kernel according to the decomposed length values and the decomposed width values with the same values; or when the length and the width of each of the target feature maps have no factors, selecting a preset size as the size of the convolution kernel;
    when there is no multiplicative relationship between the length, the width and the size of the convolution kernel, performing a zero-padding processing on each of the target feature maps until the length and the width of each of the target feature maps are the multiple of the size of the convolution kernel;
    extracting a convolution stride from the size of the convolution kernel, and performing the convolution operation on each of the target feature maps by the convolution kernel and obtaining the feature values.

6. The method as recited in claim 1, wherein generating the target vector of each of the target models according to the average pooling layers, the feature values, and the target values comprises:
    generating a pixel average value corresponding to the feature values according to the target values, comprising: when the target values are singular, calculating a ratio of each of the feature values to one target value, and obtaining the pixel average value corresponding to each of the feature values; or when the target values are multiple, calculating a first ratio of each of the feature values to a first target value, and calculating a second ratio of the first ratio to a second target value, repeating above calculating operation of ratios until a final ratio corresponding to a last target value of the target values is calculated, and taking the final ratio as the pixel average value corresponding to each of the feature values;
    splicing the pixel average values and obtaining the target vector.

7. The method as recited in claim 1, wherein determining the classification results of the images according to the label categories and the probability values of the label categories comprises:
  calculating a probability average value of same label category in the target models;
  determining one label category with a largest probability average value as a classification result of the images.

8. The method as recited in claim 7, wherein calculating the probability average value of the same label category in the target models comprises:
  calculating a number of categories of the classification models;
  counting a sum of the probability values of each of the label categories output by the classification models and obtaining the sum of the probability values;
  calculating a ratio of the sum of probability value to the number of the categories and obtaining the probability average value.

9. An electronic device comprising:
  a processor; and
  a non-transitory storage medium coupled to the processor and configured to store a plurality of instructions, which cause the processor to:
  obtain images to be classified, and obtain classification models;
  replace global average pooling layers of each of the classification models with convolutional layers and average pooling layers and obtain target models, and each of the target models comprising input layers, the convolutional layers, average pooling layers and classification layers;
  perform an image segmentation on the images and obtaining target images;
  input the target images into each of the input layers and generate target feature maps;
  generate target values according to a size of each of the target feature maps;
  perform a convolution operation on the target feature maps by the convolution layers and generating feature values;
  generate a target vector of each of the target models according to the average pooling layers, the feature values, and the target values;
  input the target vector into the classification layers of a corresponding target model and obtain label categories and probability values of the label categories;
  determine classification results of the images according to the label categories and the probability values of the label categories.

10. The electronic device as recited in claim 9, wherein the plurality of instructions are further configured to cause the processor to:
  obtain training images;
  construct classification networks according to different convolutional neural networks;
  train each of the classification networks according to the training images and obtain the classification models.

11. The electronic device as recited in claim 9, wherein the plurality of instructions are further configured to cause the processor to:
  perform an image enhancement processing on the images and obtain enhanced images;
  perform a binarization processing on the enhanced images and obtain binarized images;
  determine a position of objects in the binarized images according to a difference in pixel values of the pixel points in the binarized images;
  segment the binarized images according to the position of objects, and obtain target areas;
  perform a normalization processing on sizes of the target areas and obtain the target images.

12. The electronic device as recited in claim 9, wherein the plurality of instructions are further configured to cause the processor to:
  when a length and a width of each of the target feature maps comprises factors, factorize the length of each of the target feature maps and obtaining decomposed length values that are different from each other, and factorize the width of each of the target feature maps and obtaining decomposed width values that are different from each other;
  multiply each of the decomposed length values and a corresponding decomposed width value with the same value and obtain the target values; or
  when the length and the width of each of the target feature maps do not comprise factors, take a multiplication result of the length and the width of as the target values.

13. The electronic device as recited in claim 12, wherein the plurality of instructions are further configured to cause the processor to:
  generate a size of a convolution kernel according to the length and the width of each of the target feature maps, comprising: when the length and the width of each of the target feature maps comprises the factors, determining the size of the convolution kernel according to the decomposed length values and the decomposed width values with the same values; or when the length and the width of each of the target feature maps have no factors, selecting a preset size as the size of the convolution kernel;
  when there is no multiplicative relationship between the length, the width and the size of the convolution kernel, perform a zero-padding processing on each of the target feature maps until the length and the width of each of the target feature maps are the multiple of the size of the convolution kernel;
  extract a convolution stride from the size of the convolution kernel, and perform the convolution operation on each of the target feature maps by the convolution kernel and obtaining the feature values.

14. The electronic device as recited in claim 9, wherein the plurality of instructions are further configured to cause the processor to:
  generate a pixel average value corresponding to the feature values according to the target values, comprising: when the target values are singular, calculating a ratio of each of the feature values to one target value, and obtaining the pixel average value corresponding to each of the feature values; or when the target values are multiple, calculating a first ratio of each of the feature values to a first target value, and calculating a second ratio of the first ratio to a second target value, repeating above calculating operation of ratios until a final ratio corresponding to a last target value of the target values is calculated, and taking the final ratio as the pixel average value corresponding to each of the feature values;
  splice the pixel average values and obtain the target vector.

15. The electronic device as recited in claim 9, wherein the plurality of instructions are further configured to cause the processor to:
    calculate a probability average value of same label category in the target models;
    determine one label category with a largest probability average value as a classification result of the images.

16. The electronic device as recited in claim 15, wherein the plurality of instructions are further configured to cause the processor to:
    calculate a number of categories of the classification models;
    count a sum of the probability values of each of the label categories output by the classification models and obtain the sum of the probability values;
    calculate a ratio of the sum of probability value to the number of the categories and obtain the probability average value.

17. A non-transitory storage medium having stored thereon instructions that, when executed by at least one processor of an electronic device, causes the least one processor to execute instructions of a method for classifying images, the method comprising:
    obtaining images to be classified, and obtaining classification models;
    replacing global average pooling layers of each of the classification models with convolutional layers and average pooling layers and obtaining target models, and each of the target models comprising input layers, the convolutional layers, average pooling layers and classification layers;
    performing an image segmentation on the images and obtaining target images;
    inputting the target images into each of the input layers and generating target feature maps;
    generating target values according to a size of each of the target feature maps;
    performing a convolution operation on the target feature maps by the convolution layers and generating feature values;
    generating a target vector of each of the target models according to the average pooling layers, the feature values, and the target values;
    inputting the target vector into the classification layers of a corresponding target model and obtaining label categories and probability values of the label categories;
    determining classification results of the images according to the label categories and the probability values of the label categories.

18. The non-transitory storage medium as recited in claim 17, wherein the method comprising:
    performing an image enhancement processing on the images and obtaining enhanced images;
    performing a binarization processing on the enhanced images and obtaining binarized images;
    determining a position of objects in the binarized images according to a difference in pixel values of the pixel points in the binarized images;
    segmenting the binarized images according to the position of objects, and obtaining target areas;
    performing a normalization processing on sizes of the target areas and obtaining the target images.

19. The non-transitory storage medium as recited in claim 17, wherein the method comprising:
    when a length and a width of each of the target feature maps comprises factors, factorizing the length of each of the target feature maps and obtaining decomposed length values that are different from each other, and factorizing the width of each of the target feature maps and obtaining decomposed width values that are different from each other;
    multiplying each of the decomposed length values and a corresponding decomposed width value with the same value and obtaining the target values; or
    when the length and the width of each of the target feature maps do not comprise factors, taking a multiplication result of the length and the width of as the target values.

20. The non-transitory storage medium as recited in claim 19, wherein the method comprising:
    generating a size of a convolution kernel according to the length and the width of each of the target feature maps, comprising: when the length and the width of each of the target feature maps comprises the factors, determining the size of the convolution kernel according to the decomposed length values and the decomposed width values with the same values; or when the length and the width of each of the target feature maps have no factors, selecting a preset size as the size of the convolution kernel;
    when there is no multiplicative relationship between the length, the width and the size of the convolution kernel, performing a zero-padding processing on each of the target feature maps until the length and the width of each of the target feature maps are the multiple of the size of the convolution kernel;
    extracting a convolution stride from the size of the convolution kernel, and performing the convolution operation on each of the target feature maps by the convolution kernel and obtaining the feature values.

* * * * *